(12) United States Patent
Gerlach et al.

(10) Patent No.: US 12,534,015 B2
(45) Date of Patent: Jan. 27, 2026

(54) OPTICAL DEVICE AND VEHICLE (71) Applicants: PLASTIC OMNIUM LIGHTING SYSTEMS GmbH, Munich (DE); CONTINENTAL AUTOMOTIVE TECHNOLOGIES GmbH, Hannover (DE)

(72) Inventors: Berthold Gerlach, Giengen (DE); Thomas Feil, Iggingen (DE); Eduard Lemmer, Neu-Ulm (DE); Jozsef Szekely, Gannertshofen (DE); Lars Kolbe, Egmating (DE); Marcel Pozimski, Donaustauf (DE); Christoph Gaerditz, Regensburg (DE); Christian Rudolf, Neresheim (DE); Michael Koths, Dischingen (DE)

(73) Assignees: PLASTIC OMNIUM LIGHTING SYSTEMS GmbH, Munich (DE); CONTINENTAL AUTOMOTIVE TECHNOLOGIES GmbH, Hannover (DE)

( * ) Notice: Subject to any disclaimer, the term of this patent is extended or adjusted under 35 U.S.C. 154(b) by 68 days.

(21) Appl. No.: 18/577,090

(22) PCT Filed: Jul. 6, 2022

(86) PCT No.: PCT/EP2022/068720
§ 371 (c)(1),
(2) Date: Jan. 5, 2024

(87) PCT Pub. No.: WO2023/280909
PCT Pub. Date: Jan. 12, 2023

(65) Prior Publication Data
US 2024/0326686 A1    Oct. 3, 2024

(30) Foreign Application Priority Data
Jul. 7, 2021    (DE) .......................... 102021117539.9

(51) Int. Cl.
*B60Q 3/60* (2017.01)
*B60Q 1/04* (2006.01)
*F21V 21/30* (2006.01)

(52) U.S. Cl.
CPC ............. *B60Q 3/60* (2017.02); *B60Q 1/0425* (2013.01); *B60Q 1/045* (2013.01); *F21V 21/30* (2013.01);
(Continued)

(58) Field of Classification Search
CPC .. B60Q 3/60; B60Q 2500/00; B60Q 2200/30; B60Q 2200/38; B60Q 1/0425; B60Q 1/045; F21V 21/30
(Continued)

(56) References Cited

U.S. PATENT DOCUMENTS

| 6,039,466 A | 3/2000 | Duchenne et al. |
| 2008/0106909 A1 | 5/2008 | Kusagaya |
| 2017/0234499 A1* | 8/2017 | Pai .......................... B60Q 1/076 362/524 |

FOREIGN PATENT DOCUMENTS

| CH | 124653 A | 2/1928 |
| DE | 3437198 C2 | 6/1987 |

(Continued)

OTHER PUBLICATIONS

Machine translate of DE3437198A1 (Aug. 8, 85) (Year: 1985).*
(Continued)

*Primary Examiner* — Laura K Tso (57) ABSTRACT

The invention discloses a projector unit comprising a housing on which a light module is supported to be pivotable in two spatial directions. Via eccentrics which are supported on the housing, the light module can be rotated in two axes of rotation each having a specific angle of rotation. Preferably, via one eccentric, the light module is pivoted along with the (Continued)

axis of rotation and, via the further eccentric, the light module is rotated about the axis of rotation.

14 Claims, 6 Drawing Sheets

(52) U.S. Cl.
CPC ...... *B60Q 2200/30* (2013.01); *B60Q 2200/38* (2013.01); *B60Q 2500/00* (2013.01)

(58) Field of Classification Search
USPC .................................................. 362/523, 524
See application file for complete search history.

(56) References Cited

FOREIGN PATENT DOCUMENTS

| | | |
|---|---|---|
| EP | 2682304 A1 | 1/2014 |
| FR | 3038693 A1 | 1/2017 |
| JP | 4123784 B2 | 7/2008 |

OTHER PUBLICATIONS

Office Action dated Mar. 16, 2022 issued by the German Patent and Trademark Office and an English-language translation thereof.
International Search Report issued by the European Patent Office as ISA and mailed on Sep. 23, 2022 and an English-language translation thereof.
Written Opinion of the International Search Authority dated Jan. 12, 2023 and an English-language translation thereof.

\* cited by examiner

OPTICAL DEVICE AND VEHICLE

The invention is based on an optical device, specifically for a vehicle, which has at least one adjustable light module. In addition, the invention relates to a vehicle comprising the optical device.

It is known from prior art to provide a vehicle interior of a vehicle comprising an LED projector (LED=Light Emitting Diode). Using said LED projector, for example patterns or fonts can be emitted on a target surface. The light emitted by the LED projector has a radiating direction which can be adjustable.

It is the object of the present invention to provide an optical array in which a radiating direction of an emitted light is adjustable in an optical device for a vehicle in a device-related simple manner. Furthermore, a vehicle comprising such optical device is intended to be provided.

This object is achieved, as regards the optical device, according to the features of claim 1, and as regards the vehicle, according to the features of claim 10.

Particularly advantageous configurations are found in the dependent claims.

According to the invention, an optical device, specifically for a vehicle, comprising at least one light module is provided. The light module has at least one light source, specifically an LED. The light module can be designed as a projector, for example. Furthermore, the optical device has a housing that can preferably be attached or tightly fixed to the vehicle. The light module can be arranged on the housing. Preferably, at least one bearing or one bearing point is provided via which the light module is supported to be rotatable and/or pivotable on the housing, in particular between predetermined limits. Advantageously, a rotational position of the light module relative to the housing can be adjusted using means. As means, at least one eccentric is preferably interposed between the light module and the projector housing. Said eccentric may be designed so that, when the eccentric is adjusted or rotated, specifically about its axis of rotation, the light module is rotatable and/or pivotable relative to the bearing and/or relative to the housing.

This solution offers the advantage of a radiating direction of light emitted by the light module being easily adjustable via the eccentric. In particular, use can be made of the fact that a rotation of the eccentric results in a translational or rotational displacement of a connecting area of the light module with the eccentric and the light module in turn pivots about the bearing which may be spaced apart from the connecting area. It is a further advantage that a maximum rotation path of the light module can be predetermined by the design of the eccentric. Thus, the translation between the rotational and translational displacement paths can be set using the eccentric.

Advantageously, the eccentric is spaced apart from the pivot axis or axis of rotation of the light module or is arranged next to the pivot axis or the axis of rotation of the light module, thereby allowing the eccentric to be arranged in a spatially flexible manner and a lever for adjusting the light module to be designed mechanically. As a result, comparatively low adjusting forces are required.

The eccentric and the light module are further preferably designed so that rotation of the eccentric—about its axis of rotation-pivots or rotates the light module about the bearing. For this purpose, the eccentric can act directly on the light module, for example.

Alternatively, or additionally, the connecting area or an adjustment unit, specifically a carriage, may be provided between a/the eccentric and the light module. The eccentric, the adjustment unit and the light module are preferably designed such that a rotation of the eccentric—about its axis of rotation-translationally displaces the adjustment unit and the latter in turn pivots or rotates the light module about the bearing.

In another configuration of the invention, the light module can be supported via the at least one bearing rotatably about at least two bearing axes or axes of rotation. A first bearing axis is fixed in position preferably with respect to the housing. The further second bearing axis, on the other hand, can be variable in position with respect to the housing. Thus, the light module can be flexibly adjusted to set a radiating direction of the light emitted by the light module. In a device-related simple manner, it is conceivable that the second bearing axis is rotatable together with the light module about the first bearing axis, specifically using the eccentric. Preferably, the eccentric is or the eccentrics, if there are several, are spaced apart from the bearing axis/axes.

In another configuration of the invention, the at least one eccentric can be prevented from independently adjusting or rotating by form closure and/or force closure. Accordingly, the position of the light module relative to the housing can be easily fixed. It would be further conceivable for the form closure and/or the force closure to be designed so that the eccentric is adjustable with a minimum torque about its axis of rotation which is applied to the eccentric via a tool for setting the light module, for example, by overcoming the form closure and/or force closure.

In another configuration of the invention, at least two eccentrics are provided. Preferably, the light module can be rotatable about a or the first bearing axis using the first eccentric. Further preferably, the light module can be rotatable about a or the second bearing axis using the second eccentric. Consequently, the position of the light module can be set flexibly, in particular as the eccentrics can be rotatable independently of each other. Further preferably, the optical device is designed so that the second bearing axis is rotatable independently of the first bearing axis. This means, for example, that when the second eccentric is rotated, the light module is rotated about the second bearing axis but not about the first bearing axis, preferably also vice versa.

Preferably, the at least one eccentric or the first eccentric, the light module and the housing are designed and arranged so that the axis of rotation of the eccentric and the axis of rotation of the light module about which the eccentric or the respective eccentric can pivot or rotate the light module are not coaxial to each other. In other words, the axes of rotation are spaced from each other and/or intersect each other and/or extend in different directions or extend at a parallel distance from each other.

Preferably, the second eccentric, the light module and the housing are designed and arranged so that the axis of rotation of said eccentric and the axis of rotation of the light module about which said eccentric can pivot or rotate the light module are not coaxial to each other. In other words, the axes of rotation are spaced from each other and/or intersect each other and/or extend in different directions or extend at a parallel distance from each other. In another configuration of the invention, the optical device is designed and the eccentrics are arranged and designed so that, via the first eccentric, in addition the second eccentric is, particularly translationally, displaceable, specifically transversely to its axis of rotation, along with the light module when adjusting the light module. Preferably, the displacement is carried out such that a rotational position of the light module remains constant relative to the second bearing axis and is also varied relative to the first bearing axis.

In a preferred configuration, the eccentrics are rotatably supported on the housing. It is particularly conceivable to support the eccentrics to be directly rotatable on the housing. Further preferred, the eccentrics are arranged at a parallel distance from each other in a device-related simple manner, which results in a compact design.

In a preferred embodiment, the light module can be rotatably supported between two bearings. They preferably span a and the or the second bearing axis. The light module can be rotatable about the bearing axis and/or with the bearing axis, in particular relative to the housing, by the eccentric or by the second eccentric. Accordingly, a bearing axis can be defined by the two bearings in a device-related simple manner. It is conceivable that the first bearing is fixed to the housing and the second bearing is displaceable along with the second eccentric and/or the, particularly second, bearing axis. This results in a particularly simple design of the optical device. As an alternative, it would be conceivable to arrange the eccentrics fixed to the housing and to, specifically translationally, displace only the second bearing, particularly to rotate it about the bearing axis.

One bearing may be a housing bearing fixed to the housing which is fixed within the housing. The other bearing may be a movable bearing displaceable at least in one spatial direction relative to the housing. Since the movable bearing is displaceable, thus also the bearing axis spanned over the movable bearing or the second bearing is displaceable, particularly relative to the housing. Hence, this is achieved by changing a relative position of the two bearings by allowing the movable bearing to be displaced. The movable bearing is preferably moved by the eccentric or by a further eccentric or by the first eccentric to adjust the position of the light module. Preferably, the axis of rotation of the eccentric and the bearing axis are spaced apart from or not coaxial to each other, wherein it is conceivable that, as geometrically seen, the axes intersect, in particular in a specific pivot or rotational position of the bearing axis.

In a device-related simple manner, the movable bearing can be provided on a carriage. This allows guided displacement of the movable bearing. Preferably, the carriage is supported on the housing to be displaceable in at least one spatial direction, in particular the carriage is supported on a, particularly linearly extending, carriage guide. Thus, when displacing the carriage, the movable bearing can be displaced relative to the housing along the carriage guide. Accordingly, the carriage guide is preferably linear. Also, a non-linear carriage guide would be imaginable.

The eccentric for adjusting the movable bearing is preferably provided as a housing eccentric between the carriage and the housing. The housing eccentric then can be designed so that, when the housing eccentric is adjusted or rotated, particularly about its axis of rotation, the carriage is adjustable relative to the housing in the at least one spatial direction along its carriage guide. As a result, the light module can be rotated, particularly along with its bearing axis, in a device-related simple manner.

In a further configuration of the invention, the eccentric or the second eccentric for rotation of the light module about the, particularly second, bearing axis can be provided as a carriage eccentric between the carriage and the light module. The carriage eccentric is preferably configured so that, when the carriage eccentric rotates about its axis of rotation, the light module is rotatable about the, particularly second, bearing axis. This is advantageous as the carriage eccentric can thus be moved along with the carriage in a device-related simple manner.

It would also be conceivable to arrange the eccentric or second eccentric simply between the housing and the light module. Accordingly, the carriage would not move along the second eccentric but only the movable bearing. This can be of advantage as the second eccentric thus has a fixed position on the housing, which may facilitate attachment of a tool. This would preferably involve the fact that the two axial positions mutually affect each other during adjustment.

In another configuration of the invention, the housing eccentric is supported rotatably on or in the housing in a device-related simple way. The housing eccentric can have an eccentric section and a pin-shaped bearing section. An eccentric axis of the eccentric section and an axis of rotation of the bearing section are preferably arranged at a parallel distance from each other. Thus, simply by rotation of the housing eccentric about its axis of rotation, the eccentric section can be pivoted and can exert a translational displacing force, for example upon the carriage. The eccentric section simply abuts on the carriage with its circumferential surface, for example. As a result, when the housing eccentric rotates about its axis of rotation, the carriage can be displaced, particularly translationally, relative to the axis of rotation over the circumferential surface of the eccentric section. Preferably, the carriage is displaced transversely to the axis of rotation of the eccentric. The circumferential surface simply has a circular cross-section, for example, and/or has a circular-cylindrical shape.

The housing eccentric, particularly an eccentric head of the housing eccentric, can have a tool holder so as to rotate the housing eccentric about its axis of rotation. The tool holder is preferably designed so that a wrench and/or a screwdriver and/or a tool corresponding to the tool holder can engage in the latter.

The housing eccentric preferably can be fixed in its axial direction by positive fit on the housing. This enables safe arrangement of the housing eccentric. For rotatably supporting the housing eccentric, the housing preferably includes a housing holder. The housing holder may include an internal collar engaging in a, particularly foot-side, annular groove of the housing eccentric to secure the latter in an axially positive fit. The annular groove is preferably formed on the bearing section of the housing eccentric. In a further configuration of the housing eccentric, it is conceivable that it includes a tapering foot section, in particular to pass through the collar of the housing holder during assembly. In so doing, the foot section tapers preferably in the direction away from the eccentric section.

In a further configuration, it is conceivable that the housing eccentric includes a longitudinal groove extending from the foot section of the eccentric section. Said longitudinal groove preferably extends along the axis of rotation. The longitudinal groove can be introduced from the end face of the housing eccentric into the latter. Consequently, the housing eccentric can form two elastically deformable legs, in particular in the area of the bearing section. This is of advantage as the legs are elastically deformable when the housing eccentric is assembled so that the latter can be moved particularly through the collar of the housing holder.

Advantageously, the housing eccentric, specifically the bearing section of the housing eccentric, has a tooth profile or a knurling or flutes. The latter can engage positively and/or non-positively in the housing so as to prevent the housing eccentric from adjusting independently. The form closure then can be overcome by a tool, for example, to rotate the housing eccentric. Discrete rotation of the housing eccentric can be achieved by the tooth profile. A tooth spacing and the design of the eccentric section and the tooth profile define the release and the maximum rotation. Both can be customized in accordance with customer specifications, for example.

In a further configuration of the invention, the housing includes, specifically in the housing holder, corresponding knurling or corresponding flutes or a corresponding tooth profile regarding the housing eccentric.

The knurling or the grooves or the tooth profile of the housing eccentric and/or the housing holder extend(s) preferably in parallel to the axis of rotation. The flutes may be longitudinal flutes, for example. Preferably, the tooth profile or the flutes is/are formed circumferentially around the bearing section of the housing eccentric. When a longitudinal groove is provided, it can penetrate, at least partially, the knurling or the flutes or the tooth profile by the longitudinal groove extending at least partially through the bearing section. The legs of the housing eccentric formed by the longitudinal groove are advantageous as they allow elastic deformation of the housing eccentric in the area of the tooth profile or the flutes or the knurling so as to overcome the form closure when a torque is applied to the housing eccentric using a tool.

It is imaginable that at least one further eccentric or further eccentrics or the further eccentric or the further eccentrics is/are configured in accordance with one or more aspects of the described housing eccentric.

In a further preferred embodiment, the carriage can include a stop in at least one displacement direction to restrict the adjustment of the light module. Without the stop, an adjustment path for adjusting the light module is predetermined by the design of the eccentric. The stop can thus help restrict the adjustment path where needed. It is further conceivable to provide two stops for a respective displacement direction between which stops the carriage can be displaced in the housing eccentric. The stop or stops is/are preferably formed in a longitudinal groove of the carriage extending in the displacement direction in which a housing projection can engage.

Further preferred, the carriage is positively fastened to be displaceable on the housing. This can be realized, for example, by the longitudinal groove including the housing projection. It would be conceivable that the housing projection is not used as stop in this case.

The carriage guide may be a rail on the housing which may extend transversely to the axis of rotation of the housing eccentric. The carriage can encompass the carriage guide by two carriage legs, for example. As a result, the rail can be arranged between the carriage legs and the carriage can preferably be supported on the rail. In one carriage leg or in both carriage legs the or a respective longitudinal groove can be introduced in which the or a respective housing projection engages. Preferably, the housing projection or the housing projections is/are simply configured on the rail. Between the carriage legs, the carriage may have an internal guide surface via which the carriage can bear against or on the rail. Alternatively, or additionally, a respective carriage leg may include an internal leg surface, the internal leg surfaces facing each other. They can laterally guide the carriage along the rail.

One leg or a respective leg of the carriage preferably has an end face extending along the guide rail which may face away from the carriage. Starting from the end face, a link may be introduced into the carriage leg or into a respective carriage leg. The link preferably extends on an inner side of the legs. The link or the respective link may open into the longitudinal groove or the respective longitudinal groove. The link(s) can be used during assembly of the carriage to insert the housing projection. Preferably, the links open into the longitudinal groove at the end side of the same. Thus, the carriage can be mounted to the housing for example before the housing eccentric is inserted. When the housing eccentric is then inserted between the housing and the carriage, it is conceivable that the link is introduced to the leg in such a way that the housing projection does not reach this position in the mounted state of the housing eccentric.

The or a respective housing projection may be in the form of a detent lug, for example. The detent lug can apply force to the carriage via the longitudinal groove or a respective longitudinal groove so that the carriage abuts on the guide rail via its internal guiding surface and/or its end faces and is supported by the latter. As an alternative or in addition to the tooth profile of the housing eccentric, it would be imaginable that the detent lug engages in a possible grid of the longitudinal groove. It would be imaginable to provide this as an alternative or an addition to the tooth profile of the housing eccentric.

The rail may include, on its rail side or rail upper side facing the internal guiding surface of the carriage, a spring extending along the rail. Said spring can engage in a corresponding groove of the carriage to allow improved guiding.

In a further configuration, the carriage eccentric is advantageously supported to be rotatable on the carriage. For this purpose, the carriage can include a, specifically continuous, eccentric holder for the carriage eccentric. The eccentric holder is formed, e.g., in terms of device and to save space, in a tab of the carriage. A longitudinal axis of the carriage eccentric extends preferably transversely to the displacement direction of the carriage. In its axial direction, the carriage eccentric can be biased via a spring to connect the carriage eccentric non-positively in its direction of rotation and/or axial direction to the carriage, for example.

In a further configuration of the invention, the carriage eccentric may include an eccentric section and a bearing section. The bearing section preferably constitutes an axis of rotation for the eccentric section. Via the bearing section, the carriage eccentric can be supported rotatably in or on the carriage, specifically in the eccentric holder. The eccentric axis of the eccentric section is preferably arranged at a parallel distance from the axis of rotation of the bearing section. The eccentric section preferably has a circumferential surface which abuts, specifically directly, on the light module. During rotation of the carriage eccentric, an adjusting force can thus act on the light module to adjust the same in response to the angle of rotation of the carriage eccentric. Preferably, the light module has a holder for the eccentric section which includes in particular an internal holding surface on which the circumferential surface of the eccentric section can abut. The holder is preferably constituted by one arm or by two arms. The latter may extend from the light module approximately in the same direction and may encompass the eccentric section which, as a result, may be arranged between the arms.

In a further configuration of the invention, the carriage eccentric can include a radial collar which is widened compared to the bearing section. The radial collar is preferably arranged coaxially to the bearing section and can be designed to be, for example, partly or completely circumferential about the axis of rotation. The radial collar further preferably has an annular surface or end face facing the axial direction. Into the latter, knurling or flutes or a tooth profile can be introduced. Accordingly, the carriage eccentric can engage positively and/or non-positively in the carriage to prevent the carriage eccentric from adjusting or rotating independently relative to the carriage. Further advantageously, the annular surface can be biased against the carriage via the spring. For example, the annular surface faces away from the eccentric section. Thus, the radial collar is provided, e.g., between the eccentric section and the bearing section. The flutes or the tooth profile preferably extend(s) in the radial direction relative to the axis of rotation. The tooth profile or the flutes thus can be arranged on a pitch circle. Further preferably, the carriage has a corresponding tooth profile or corresponding flutes so as to easily enable a form closure by the tooth profiles interlocking, for example. In a preferred solution, the carriage eccentric has a radial groove in which the spring engages to bias the carriage eccentric in its axial direction against the carriage. Preferably, the radial groove is formed on a section of the carriage eccentric protruding from the carriage. The carriage may be arranged, as seen in the axial direction of the carriage eccentric, for example, spatially between the radial groove and the radial collar. The spring preferably bears against the carriage and applies its spring force to the carriage eccentric via the radial groove so as to bias the radial collar against the carriage. Preferably, the spring is a disk spring. It can bear against the carriage eccentric with a radially inner first spring surface facing away from the carriage and can apply a spring force to the carriage on the radial outside via a second spring surface facing the carriage. Further preferably, the spring bears against the carriage via an elastic member, specifically via an O-ring. As a result, a force closure can be enabled or assisted in the direction of rotation of the carriage eccentric relative to the carriage. Further preferably, a washer is interposed between the elastic member and the spring. Thus, the spring can uniformly exert a spring force upon the elastic member. In other words, the carriage is arranged between the radial collar on the one side and the spring on the other side. It is a further advantage that the carriage eccentric includes a tool holder via which the carriage eccentric can be rotated by a tool. The tool holder is preferably provided on a side of the carriage facing away from the light module.

Further preferred, the tool holders of the eccentrics can be accessed from a common side of the optical device to allow easy adjustment.

In another preferred solution, the carriage has a bearing holder for the movable bearing. A module shaft which is formed, specifically tightly, on the light module can be supported or held to be rotatable and/or tiltable in said movable bearing. Further preferably, the bearing holder includes a through-hole through which the module shaft can be passed. Thus, on the one side of the through-hole the light module can be arranged and, on the other side of the through-hole, the module shaft can protrude therefrom with a shaft end portion. At the shaft end portion, a fastener can simply engage by means of which the module shaft can bear against the carriage preferably in the axial direction toward the light module. The module shaft can be supported on the carriage radially in the through-opening and/or by the fastener. A spring or disk spring is further preferably provided as fastener. Thus, on the one hand, the module shaft can be fastened and, on the other hand, additionally a spring force can be applied to it. Further preferred, an elastic member, specifically an O-ring, may be provided via which the light module bears against the carriage. Then the spring force can be applied to the light module simply via the spring in the direction of the carriage and in the direction of the module shaft and, accordingly, the elastic member can be clamped between the light module and the carriage. The elastic member is used for backlash-free mounting in the axial direction and supports independent rotation of the light module by the force closure. The carriage preferably includes a tab for the bearing holder. The bearing holder then can have a shell-type design on the sides of the protruding shaft end portion of the module shaft. In the through-hole of the bearing holder, further preferably plural elastic support tabs are formed on the carriage. They can protrude radially inwardly and can delimit on the radial end face an interior which is used to guide the module shaft.

In a further configuration of the invention, the housing bearing may be a spherical plain bearing which has a bearing head. The bearing head may be formed on the housing or on the light module, with a bearing head holder being appropriately provided on the light module or on the housing. The bearing head is designed as ball head, for example. Further preferably, the spherical plain bearing is configured so that the light module is held over it axially in the direction of its bearing axis by the bearing head holder encompassing the bearing head. Accordingly, the bearing head cannot come out of the bearing head holder even in the case of vibrations during use in a vehicle, for example, and the light module is safely held.

The light module preferably has a module housing in which the at least one light source is accommodated. It is conceivable to arrange several of the light sources in the module housing, such as in series. The module housing is preferably connected to a heat sink. The light module can be arranged on the housing above the heat sink. This is advantageous as the heat sink may be made of a resistant material which may be suited for safely supporting the light module on the housing. Consequently, mechanical bearing loads are not exerted directly on the module housing of the light module but on the heat sink. The heat sink may be made, e.g., of a metallic material.

Instead of the carriage eccentric, an eccentric that is supported directly on the housing can be provided, as already explained above. Said eccentric may include aspects corresponding to the housing eccentric or to the carriage eccentric or aspects of both eccentrics, for example.

It is further conceivable that the carriage eccentric is configured according to the housing eccentric or vice versa. It would also be conceivable that aspects of the carriage eccentric are replaced with aspects of the housing eccentric and vice versa.

Further advantageously, the optical device includes at least one further light module on the housing. Said light module may be designed, according to one or more of the afore-mentioned aspects, like the above-explained light module and may be supported and adjustable. Preferably, if there are two light modules, they are symmetrical. Further advantageously, they can be adjusted independently of each other, specifically via one or two respective eccentrics. In the case of two light modules on the housing, thus two carriages can be provided, for example, which are arranged coaxially to each other. Also, it would be imaginable that a different number of eccentrics can be provided for a respective light module. Accordingly, e.g. one light module can be adjustable using two eccentrics and another light module can be adjustable using one eccentric, if this is sufficient.

In addition to the non-positive and/or positive holder of the eccentric(s) in the optical device, it may be provided to use a fastener. For example, it would be conceivable for the eccentric to include a thread on which one or more lock nuts can be arranged to fix the eccentric after rotation. For this purpose, the appropriately designed eccentric preferably has a bearing section by means of which it is supported in the housing, an eccentric section and a threaded section. Both the eccentric section and at least part of the threaded section preferably protrude from the housing. As a result, the housing is arranged between the eccentric section and the threaded section. When tightening the nuts, the housing thus can be clamped between the eccentric section and the threaded section to fix the eccentric.

In accordance with the invention, a vehicle comprising the optical device according to one or more of the aforementioned aspects is provided. The optical device is preferably provided in a vehicle interior.

Hereinafter, the invention shall be illustrated by means of embodiments, wherein the Figures show in.

Figure 1:
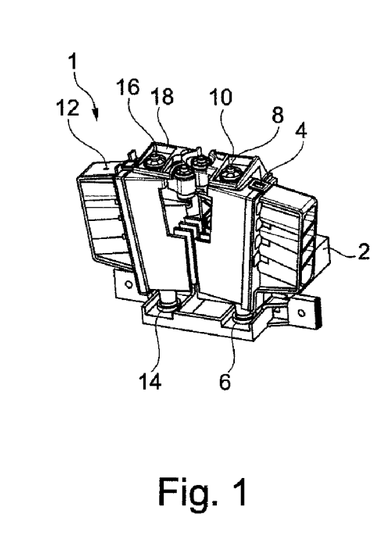
FIG. 1 a perspective view of an optical device according to a first embodiment, FIG. 2 another perspective view of the optical device according to the first embodiment, FIG. 3 a cutout of the optical device according to the first embodiment in the area of eccentrics, FIG. 4 a perspective view of an eccentric for the optical device according to the first embodiment, FIG. 5 a partly transparent view of a cutout of the optical device in the area of the mounted eccentric of FIG. 4, FIG. 6 a perspective view of a cutout of the optical device according to the first embodiment in the area of further eccentrics, FIG. 7 a perspective view of the eccentric of FIG. 6, each of FIGS. 8a to 8d a perspective view of a cutout of the optical device according to the embodiment in the area of a carriage adjustable via an eccentric, FIG. 9 a perspective view of a cutout of the optical device according to the first embodiment in the area of a bearing for a light module, FIG. 10 a perspective and partly transparent view of a cutout of the optical device according to the first embodiment in the area of a further bearing for the light module, FIGS. 11a to 11c different lateral views of the optical device according to the first embodiment, wherein adjusting options are shown, FIG. 12 a perspective view of an optical device according to a further embodiment, FIG. 13 a perspective view of a cutout of the optical device according to the further embodiment in the area of eccentrics, and FIG. 14 a perspective view of a cutout of the optical device according to the further embodiment in the area of further eccentrics.

According to FIG. 1, an optical device is shown in the form of a projector unit 1 which includes a housing 2 on which a light module 4 is arranged. The arrangement is such that the light module 4 can be rotatably adjusted via two bearing axes. The light module 4, on the one hand, is supported by means of a bearing in the form of a housing bearing 6 fixed to the housing 2 and by means of a bearing in the form of a movable bearing 8. The movable bearing 8 is connected to the housing 2 via a displaceable carriage 10 which can be used as an adjusting means. Symmetrically to the light module 4, a further light module 12 is arranged on the housing 2. Said light module 12 is appropriately supported by means of a housing bearing 14 and a movable bearing 16 arranged on the carriage 18. Each light module 4, 12 includes four respective LED or ISELED (Intelligent Smart Embedded LED). Each of the bearings 6, 8 and 14, 16 spans a bearing axis about which the respective light module 4, 12 is rotatable. According to FIG. 1, the bearing axis extends in a Z direction. The respective light module 4, 12 is rotatable along with its bearing axis about an X direction via the respective carriage 10, 18. The light modules 4, 12 are rotated using eccentrics, which will be illustrated in detail in the following.

Hereinafter, for convenience, the design and the arrangement of the light modules 4, 12 will be explained mainly based on the light module 4.

Figure 2:
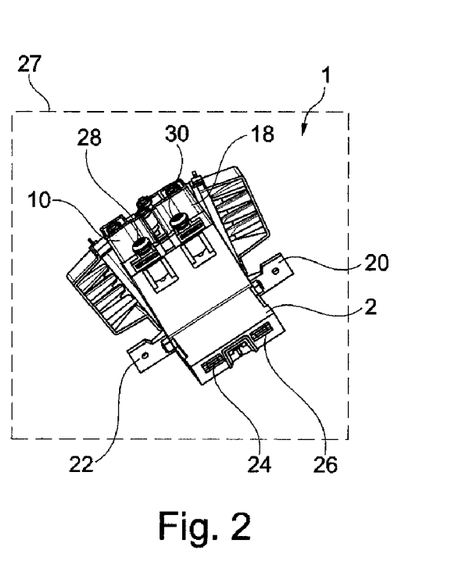

According to FIG. 2, as compared to FIG. 1 a rear view of the projector unit 1 is illustrated. It is visible that the housing 2 laterally includes mounting tabs 20, 22 and two C brackets 24, 26 to fasten the projector unit 1 in a vehicle 27. Vehicle 27 is schematically illustrated by a broken line in FIG. 2.

According to FIG. 2, two eccentrics in the form of housing eccentrics 28, 30 are shown. Each of them is used to adjust the respective carriage 10, 18 and, thus, to adjust the respective movable bearing 8, 16, see FIG. 1. By adjusting the respective movable bearing 8, 16, the respective light module 4, 12 can be rotated about the X axis, cf. also FIG. 1.

Figure 3:
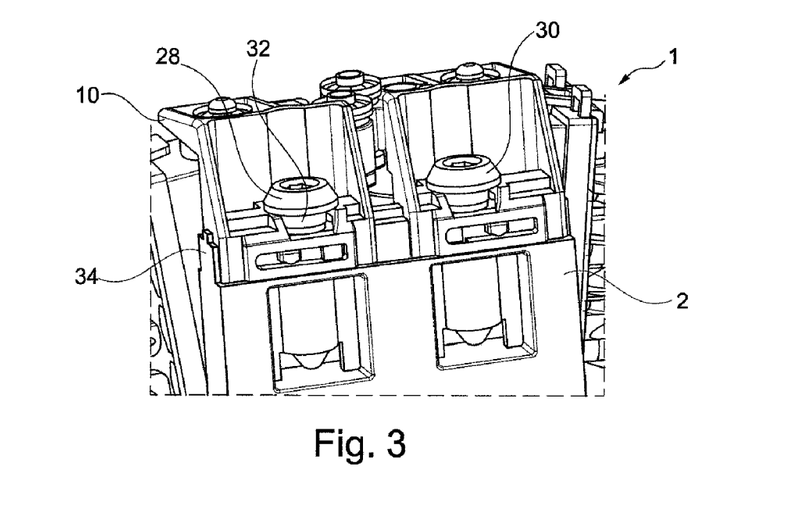

According to FIG. 3, the projector unit 1 is shown enlarged in the area of the housing eccentrics 28, 30. For convenience, the arrangement and design of the housing eccentrics 28, 30 is illustrated based on the housing eccentric 28. The eccentric 28 is arranged between the housing 2 and the carriage 10. An eccentric section 32 of the housing eccentric 28 is designed to be offset against an axis of rotation of the housing eccentric 28. The eccentric section 32 abuts, with its circumferential surface which is circular-cylindrical, for example, against the carriage 10, specifically against an eccentric holder of the carriage 10. When the housing eccentric 28 is rotated, the carriage 10 is thus displaced translationally along a rail 34 (upper web) formed on the housing. The rail 34 extends in a plane which is arranged perpendicularly to the axis of rotation of the housing eccentric 28. In other words, the carriage 10 can form a connecting area between the eccentric or the housing eccentric 28 and the light module 4. Rotation of the housing eccentric 28 results in translational displacement of the connecting area and the light module 4 performs pivoting about the housing bearing 6.

Figure 4:
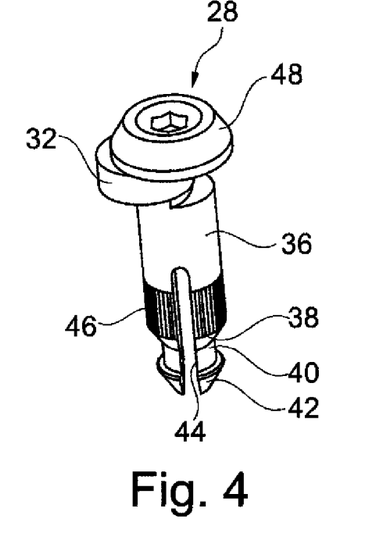

According to FIG. 4, the design of the housing eccentric 28 is visible. A bearing section 36 is formed next to the eccentric section 32. The bearing section 36 has a circular-cylindrical shape and constitutes the axis of rotation of the housing eccentric 28. The housing 2 of FIG. 3 includes a corresponding housing holder for the bearing section 36. The eccentric section 32 is arranged outside the housing holder. On its side facing away from the eccentric 32, the bearing section 36 is followed by a tapering frustoconical section 38 which, in turn, is followed by a cylindrical section 40. Following the section 40, the housing eccentric 28 widens with a foot section 42 which tapers in a further direction of extension away from the eccentric section 32 in a frustoconical or conical shape. Between the sections 38 and 42, the section 40 forms an annular groove in which a collar of the housing holder engages positively in order to fix the housing eccentric 28 in the axial direction. In the housing eccentric 28, in addition a longitudinal groove 44 is introduced. It extends from the foot section 42 into the bearing section 36 without completely penetrating the latter. Consequently, the longitudinal groove 44 is spaced apart from the eccentric section 32 as seen in the axial direction. Two legs which enable the housing eccentric 28 to be elastically inserted into the housing holder of the housing 2 are formed by the longitudinal groove 44. In addition, according to FIG.

4, a tooth profile 46 is visible which is formed in the area of the bearing section 36 and, in a different configuration, may be formed only partially (not shown). Said tooth profile is introduced at a respective outer circumferential surface of the bearing section 36. The elevations and recesses extend at a parallel distance from each other and in parallel to the longitudinal axis of the housing eccentric 28. As seen in the longitudinal direction of the housing eccentric 28, the longitudinal groove 44 completely penetrates and thus divides the tooth profile 46 into two sections. The tooth profile 46 is thus formed on the elastic legs of the housing eccentric 28. Consequently, it can elastically engage in a tooth profile of the housing 2 which is formed in the housing holder. Only in this way is a rotation of the eccentric 28 within the housing 2 possible. The tooth profile 46 extends from the section 38. The housing eccentric 28 includes a head section 48 following the eccentric section 32. The eccentric section 32 is thus formed between the head section 48 and the bearing section 36. At the end face, the head section 48 has a tool holder in the form of an internal hexagon. Other forms of tool holders are possible.

Figure 5:
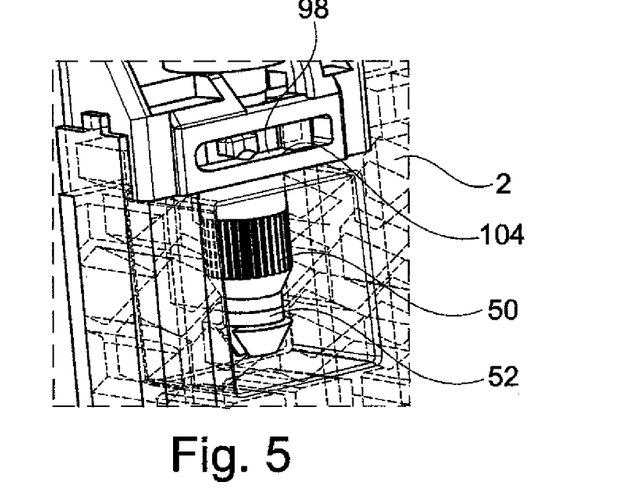

According to FIG. 5, the tooth profile 50 of the housing 2 corresponding to the tooth profile 46 is visible. In addition, a collar 52 is shown which engages positively in the annular groove of the housing eccentric 28 formed by the section 40, cf. FIG. 4.

Figure 6:
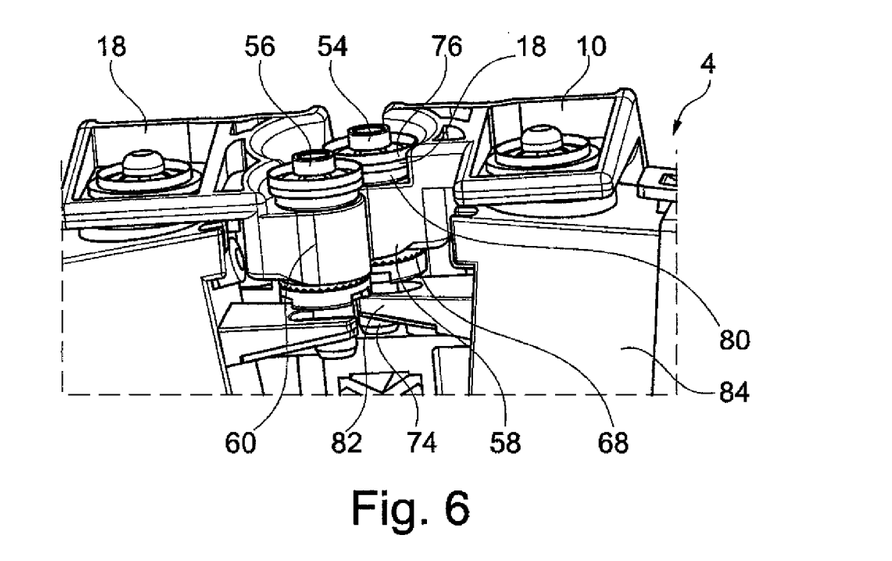

According to FIG. 6, two eccentrics in the form of carriage eccentrics 54, 56 are visible. Each of them is rotatably supported on a respective carriage 10, 18. The carriage eccentrics 54, 56 extend at a parallel distance from each other and from the eccentrics 28, 30, see FIG. 2. A respective carriage eccentric 54, 56 is supported in a respective tab 58, 60 of the respective carriage 10, 18.

Figure 7:
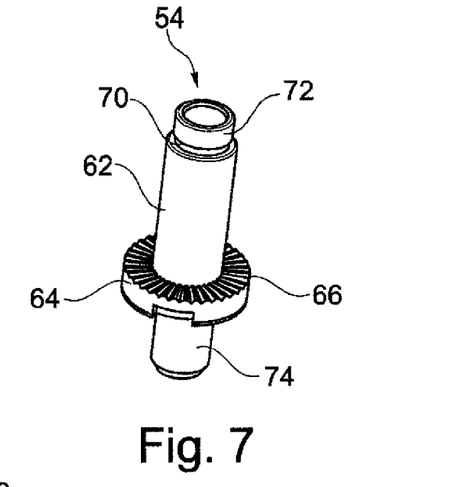

According to FIG. 7, the carriage eccentric 54 is shown, with the further carriage eccentric 56 having an identical design. The carriage eccentric 54 has a bearing section 62 via which it is rotatably supported in the associated carriage 10 of FIG. 6. Attached to the bearing section 62 is a radial collar 64 via which the carriage eccentric 54 in its axial direction bears against the carriage 10. The radial collar 64 has a tooth profile 66 at the end face on its side facing the carriage 10. The tooth profile 66 engages, according to FIG. 6, in a corresponding tooth profile 68 of the carriage 10. As seen in the axial direction, the bearing section 62 is followed, on its side facing away from the radial collar 64, by an annular groove 70. Following the latter, a head section 72 is provided for the carriage eccentric 54. It has a smaller diameter than the bearing section 62. In the head section 72, a tool holder, specifically an internal hexagon, is formed preferably at the end face. The radial collar 64 is followed, on its side facing away from the bearing section 62, by an eccentric section 74 which is offset in parallel against the remaining carriage eccentric 54 and has a circular-cylindrical circumferential surface.

According to FIG. 6, the carriage eccentric 54 is fixed to the carriage 10 using a spring in the form of a disk spring 76. The disk spring 76 engages in the annular groove 70 with its radially inner portion, cf. FIG. 7. With its, radially seen, outer portion, the annular groove 70 abuts on the carriage 10 via a washer 78 and via an O seal ring 80 or O-ring. Thus, it bears against the tab 58 via the elastic O seal ring 80 and the washer 78 and applies a spring force to the carriage eccentric 54 in the axial direction. In this way, the carriage eccentric 54 is biased, with its radial collar 64, cf. FIG. 7, against the carriage 10 and the tooth profiles 66, 68 interlock. As a result, the carriage eccentric 54 cannot detach on its own. At the same time, the elastic O seal ring 80 ensures the tooth profiles 66, 68 to rotate axially relative to each other via the tool holder in the head section 72 of the carriage eccentric 54 by allowing the tooth profiles 66, 68 to displace in the axial direction relative to each other when the carriage eccentric 54 rotates axially.

According to FIG. 6, the eccentric section 74 of the carriage eccentric 54 engages in the light module 4. For this purpose, the light module 4 includes two arms 82 between which the eccentric section 74 is arranged. The arms 82 are part of a heat sink 84 of the light module 4. By the arrangement of the carriage eccentric 54 on the carriage 10, the latter is movable transversely to its axis of rotation via the carriage 10. In other words, the arms 82 may form a connecting area between the eccentric or the carriage eccentric 54 and the light module 4. Rotation of the carriage eccentric 54 results in translational displacement of the connecting area and the light module 4 performs a pivoting about its bearing axis between the fixed bearing 6 and the movable bearing 8.

Figure 8A:
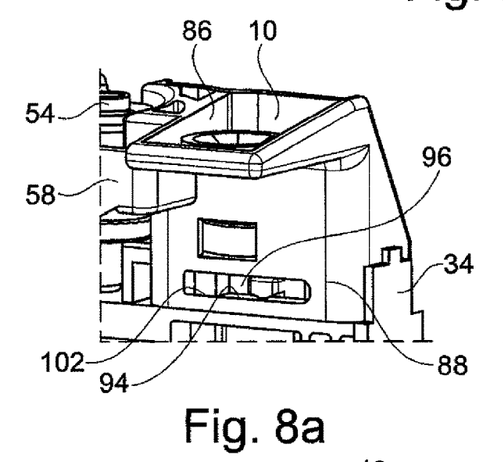
Figure 8B:
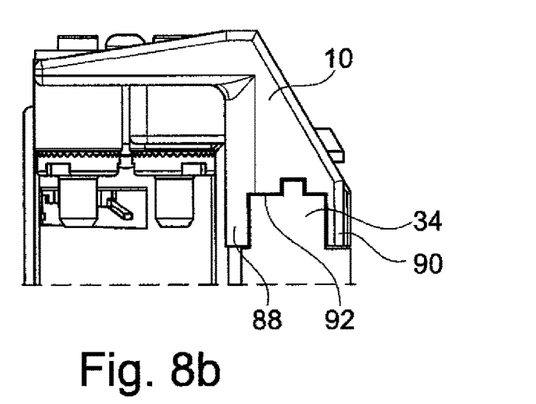

According to FIG. 8a, in addition to the tab 58 for receiving the carriage eccentric 54, the carriage 10 has a further tab 86 which is used to receive the movable bearing 8 of FIG. 1. According to FIG. 8b, the carriage 10 is guided on the rail 34 as a carriage guide. The carriage 10 encompasses the rail 34 with two carriage legs 88, 90. Between the latter, the rail 34 is then arranged. The carriage legs 88, 90 may also be designed as pre-centering relative to the rail 34 and the actual guiding is performed by the tongue and groove system on a contact surface 92—as explained below—of the rail 34. As a result, a functional separation from the longitudinal groove 94 is obtained—which will be explained below. The function of said longitudinal groove 94 shall be explained further below. Between the carriage legs 88, 90 the carriage 10 has a contact surface 92 via which it bears against an upper guiding surface of the rail 34.

According to FIG. 8a, the carriage 10 moreover includes a longitudinal groove 94 which is provided at the leg 88. The longitudinal groove 94 extends along the rail 34. A housing projection designed laterally from the rail 34 in the form of a detent lug 96 engages in the longitudinal groove 94. Via the detent lug 96, the carriage 10 is loaded approximately in the direction of the axis of rotation of the carriage eccentric 54 toward the rail 34.

Figure 8C:
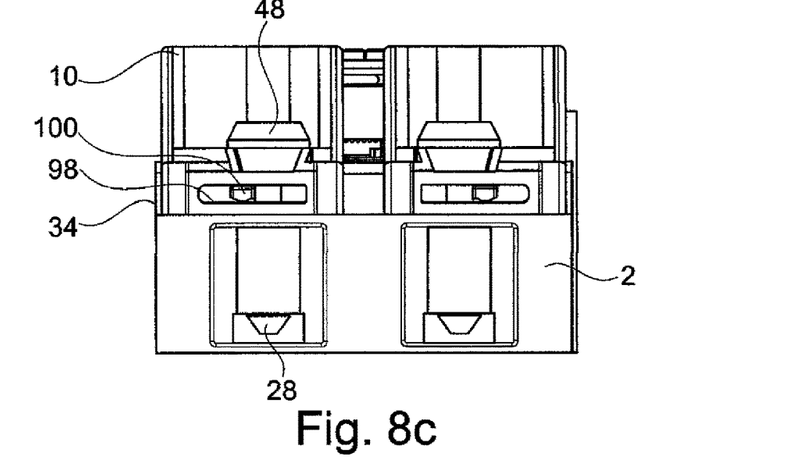

According to FIG. 8c, the carriage 10 includes another longitudinal groove 98 in which a further detent lug 100 formed at the rail 34 engages. The longitudinal groove 98 is provided at the leg 90 and extends at a parallel distance from the longitudinal groove 94. Via the detent lug 100, the carriage 10 is also loaded in the direction of the axis of rotation of the eccentric 54 of FIG. 8a toward the rail 34. Thus, the carriage 10 is retained on the guide rail by means of the detent lugs 96, 100. In addition, or as an alternative, the carriage can be retained by means of the head section 48 of the housing eccentric 28. In other words, the carriage 10 is fastened to and aligned with the housing 2 via two opposite detent lugs 96, 100, see also FIG. 8a, wherein this is achieved by means of a tongue and groove principle. The longitudinal grooves 94, 98 interacting with the detent lugs 96, 100 can restrict the displacement path of the carriage, if it is smaller than the displacement path predetermined by the housing eccentric 48. In that case, 360° rotation of the housing eccentric 48 is no longer possible, however.

According to FIG. 8c, for the assembly, the carriage 10 includes a link 102 via which the detent lug 96 can be guided into the longitudinal groove 94. According to FIG. 5, the further longitudinal groove 98 correspondingly has a link 104.

Figure 8D:
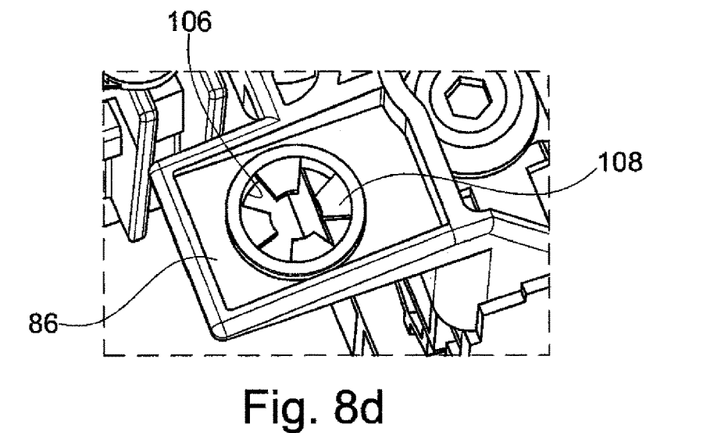

According to FIG. 8d, the configuration of the tab 86 for receiving the movable bearing 8 is shown. In the tab 86 a bearing holder 106 is formed. The latter is a through-hole which has four inwardly protruding elastic support tabs 108. For convenience, only one of them is provided with a reference numeral. The support tabs 108 radially inside delimit partially a circular-cylindrical space through which a circular-cylindrical module shaft 110, see FIG. 9, of the light module 4 can be passed.

Figure 9:
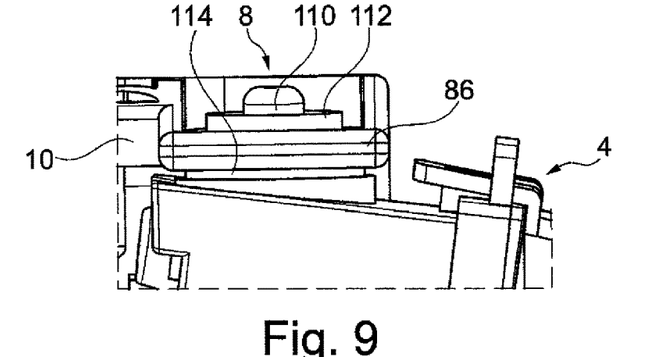

According to FIG. 9, the movable bearing 8 includes a spring in the form of a disk spring 112 which is arranged on a side of the tab 86 facing away from the light module 4. On the side of the tab 86 facing the light module 4, an elastic member in the form of an O-ring 114 or O seal ring is provided between the light module 4 and the tab 86. The module shaft 110 is formed integrally with the light module 4. It protrudes with one end portion from the tab 86 on a side facing away from the light module 4. The spring force of the disk spring 112 which bears against the tab 86 is applied via the end portion to the module shaft 110 in the axial direction away from the light module 4. The O-ring 114 is then clamped between the light module 4 and the tab 86. The movable bearing 8 can be moved along with the carriage 10 and, due to the elastic clamping via the O-ring 114 and the elastic support tabs 108, allows a pivoting movement of the module shaft 110 and, thus, of the light module 4. As an alternative, the elastic support tabs 108 can be replaced by an elastic member which combines the functions of the elastic O-ring 104 and of the elastic support tabs 108.

Figure 10:
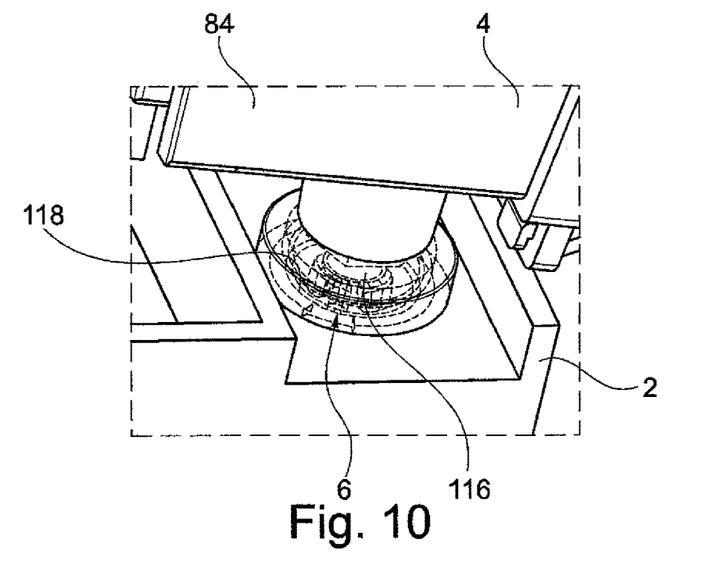

According to FIG. 10, the housing bearing 6 is shown for bearing the light module 4. The housing bearing 6 has a metallic or non-metallic ball head 116 that is tightly connected to the light module 4, specifically to the heat sink 84 of the light module 4. A ball head holder 118 is formed on the housing 2 and encompasses the ball head 116, thus preventing the ball head 116 from exiting the ball head holder 118. The ball head 116 is supported to be rotatable and pivotable in the ball head holder 118.

Figure 11A:
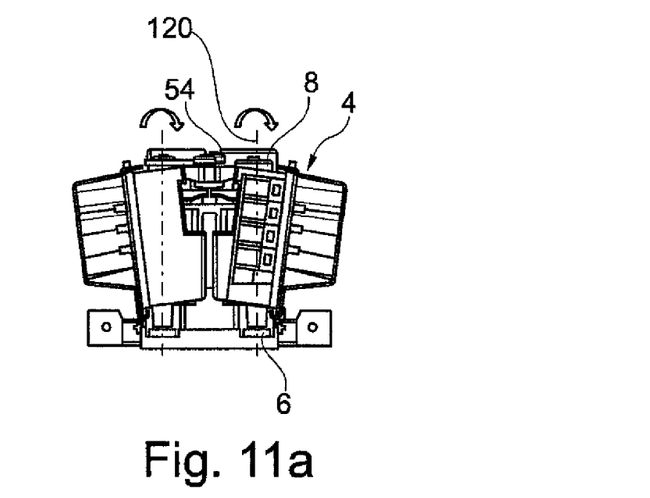
Figure 11B:
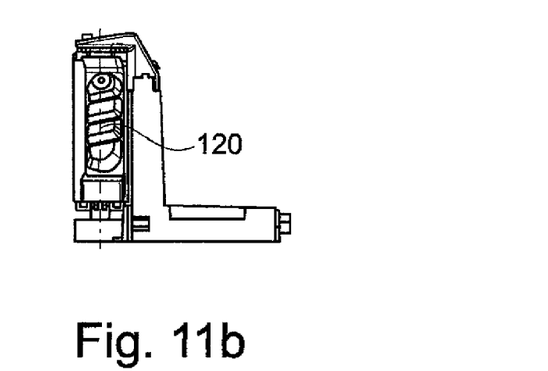
Figure 11C:
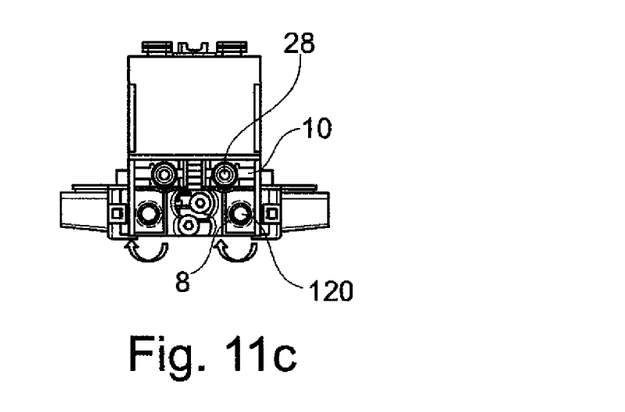

According to FIGS. 11a and 11b, the fixed bearing 6 and the movable bearing 8 define a bearing axis 120 about which the light module 4 can be rotated via the carriage eccentric 54 (see FIG. 11a) according to FIG. 11c. In accordance with FIG. 11a, the bearing axis 120 can be pivoted about the fixed bearing 6 via the housing eccentric 28 (see FIG. 11c). This is performed by adjusting the carriage 10 along with the movable bearing 8 via the housing eccentric 28.

The projector unit 1 is assembled according to FIGS. 1 to 11 preferably in the following steps:

At first, pre-mounting of two subassemblies 1 & 2 may be provided. A respective sub-assembly may include the carriage 10, the carriage eccentric 54, 56 or eccentric-Z-rotation, the O-ring 80, the washer 78 and the disk spring 76 or spring washer.

Furthermore—simultaneously before or after the aforementioned step—a respective ball head holder 118 can be assembled with the housing 2, see FIG. 10.

In a further step—before, after or between the mentioned steps—the ball heads 116 can be mounted with the heat sinks 84. This is preferably carried out by screwing or by a press-fit or by directly, specifically integrally, connecting the ball head 116 to the heat sink 84.

After mounting the ball heads 116 to the heat sink 84, the LED and/or one and/or more optical groups then can be fastened to the respective heat sink. It would also be conceivable to arrange the LED and, resp., the optical group/groups before mounting the ball heads 116. The light modules 4, 12 are formed.

In the further process, the pre-mounted subassemblies 1 & 2 can be connected to each of the light modules 4, 12, with a respective intermediate assembly being provided. It would be imaginable to carry out the mounting of the subassemblies 1 & 2 with the light modules 4, 12 even after mounting the light modules 4, 12 to the housing 2.

In the further process, unless the foregoing alternative is applied, the respective intermediate assembly is connected to the housing 2 by arranging the respective ball head 116 in the respective ball head holder 118 of the housing 2 and placing the respective carriage 10, 18 onto the rail 34.

Subsequently, the housing eccentrics 28, 30, see FIG. 3, or the eccentric-X-rotation are/is mounted. The housing eccentrics 28, 30 are held by being locked to the respective undercuts.

The projector unit 1 allows two light modules 4, 12 to be set about two respective axes of rotation. The heat sinks 84 accommodated in each of a ball socket or the ball holder 118 as well as in a respective carriage 10, 18 or adjusting carriage, which constitute parts of the respective light module 4, 12, can be rotated about the X or Z axis by each of the carriage eccentrics 54, 56 or eccentric-Z-rotation and each of the housing eccentrics 28, 30 or eccentric-X-rotation. Advantageously, it is thus possible to independently adjust two respective light modules 4, 12.

The independence of the X or Z rotation is ensured by the carriage eccentrics 54, 56 and the housing eccentrics 28, 30 being connected to a respective carriage 10, 18. In this way, the displacements of the carriages 10, 18 along the +/− direction caused by the housing eccentrics 28, 30 result in a rotation of the light modules 4, 12 about the X axis. Since, with such +/− displacement of the respective carriage 10, 18, the respective carriage eccentric 54, 56 is not rotated relative to the axis, no dependent Z rotation is generated. The latter is preferably carried out exclusively by rotation of the carriage eccentrics 54, 56 each of which engages in a heat sink fork of a respective heat sink 84 and, in this way, initiates rotation about the Z axis. Since rotation of the light modules 4, 12 also results in an inclination of the bearing axis 120 and, resp., the module shaft 110 of the respective movable bearings 8, 16, it is of advantage to design the movable bearings 8, 16 to be resilient/elastic.

Zero backlash, even under the load of temperature change, is achieved by form closure at the tooth profiles or eccentric tooth profiles 66 and with the aid of the O-rings 80 which compensate for changes in length. In order to prevent the carriages 10, 18 from lifting off the rail 34 or from the guide, there are provided the respective two longitudinal grooves 94, 98 or tabs in which the two detent lugs 96, 100 engage.

Independent rotation of the light modules 4, 12 is preferably suppressed by form closure at the eccentric teeth or tooth profiles 66 of the carriage eccentrics 54, 56 and by force closure by means of the O-rings 80.

The afore-described form closure and force closure also ensure that no further securing elements are required. This also eliminates the need for loosening or tightening those additional elements before or after the adjusting step.

Easy adjustability of the projector unit 1 is achieved by internal hexagons each of which can be easily reached and operated from above.

The maximum rotations/pivots of the light modules 4, 12 about the X and Z axes can be individually adapted by the sizes of the eccentrics of the housing eccentrics 28, 30 and the carriage eccentrics 54, 56. In the discrete case of adjustment, the tooth pitches of the tooth profiles 46, 50, 66, 68 of the eccentrics 28, 30, 54, 56 in combination with the eccentric dimensions predefine the adjusting accuracy. The latter can be customized corresponding to customer needs.

The present projector unit 1 enables backlash-free adjustment. Moreover, the eccentrics 28, 30, 54, 56 or setting members are prevented from loosening or moving on their own. There is no need for additional securing elements which have to be operated before or after the adjustment. Consequently, the setting is not affected via those elements during tightening. The eccentrics 28, 30, 54, 56 are allowed to be easily accessible and, instead of special tools, an Allen key is required. Altogether, the projector unit 1 is a stable design. Moreover, the projector unit 1 excels by simple assembly.

Figure 12:
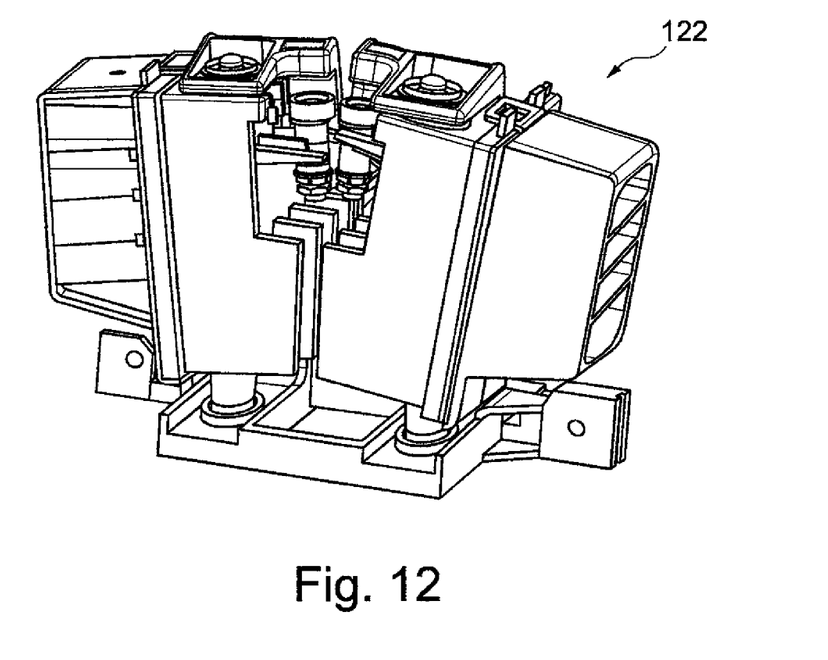
Figure 13:
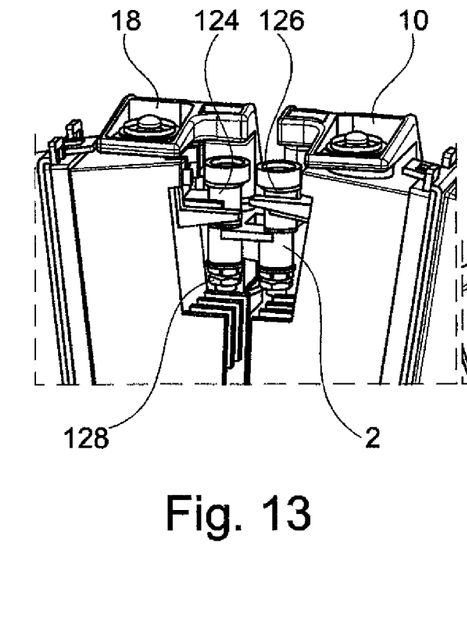
Figure 14:
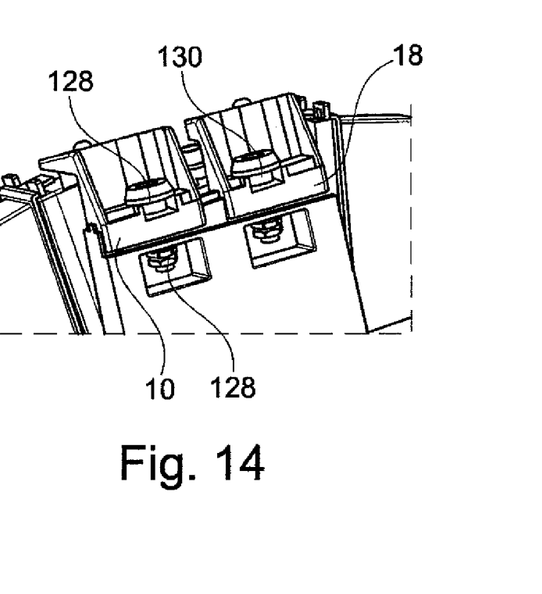

FIG. 12 illustrates a further embodiment of a projector unit 122. In contrast to the above-described embodiment, instead of the carriage eccentrics 54, 56 (see FIG. 6), according to FIG. 13 two further housing eccentrics 124 and 126 are provided. They are rotatably supported on the housing 2 and, thus, are no longer movable via the carriages 10, 18. Moreover, the eccentrics can be fixed axially and in the direction of rotation positively and non-positively using lock nuts 128 only one of which is provided with a reference numeral for convenience. According to FIG. 14, in contrast to the preceding embodiment, it is additionally provided that further housing eccentrics 128, 130 for adjusting the carriage 10, 18 can also be fixed non-positively and positively using lock nuts 128. By the embodiment according to FIG. 12 to FIG. 14 infinitely variable adjustment of the eccentrics 124 to 130 and, thus, infinitely variable adjustment of the X and Z rotation is possible through force closure instead of form closure. A defined twisting moment can be set using the lock nuts 128.

According to the above-illustrated embodiments, discrete adjustment or infinitely variable adjustment of the position of the light modules 4, 12 can therefore be enabled.

The invention discloses a projector unit comprising a housing on which at least one light module is supported to be pivotable in two spatial directions. Using eccentrics which are supported on the housing, the light module can be pivoted in two axes of rotation each having a specific angle of rotation. Preferably, via one eccentric, the light module is pivoted along with the axis of rotation and, via the further eccentric, the light module is rotated about said axis of rotation.

LIST OF REFERENCE NUMERALS

Projector unit 1, 122
housing 2
light module 4, 12
housing bearing 6, 14
movable bearing 8, 16
carriage 10, 18
mounting tabs 20, 22
C brackets 24, 26
vehicle 27
eccentrics or housing eccentrics 28, 30
eccentric section 32, 74
rail 34
bearing section 36, 62
section 38, 40
foot section 42
longitudinal groove 44
tooth profile 46, 50, 66, 68
head section 48, 72
collar 52
carriage eccentric 54, 56
tab 58, 60, 86
radial collar 64
annular groove 70
disk spring 76, 112
washer 78
O-ring 80
arms 82
heat sink 84
carriage legs 88, 90
contact surface 92
longitudinal groove 94, 98
detent lug 96, 100
link 102, 104
bearing holder 106
support tab 108
module shaft 110
O-ring 114
ball head 116
ball head holder 118
bearing axis 120
housing eccentric 124, 126
lock nut 128

The invention claimed is:

1. An optical device for a vehicle comprising at least one light module (4, 12) which includes at least one light source, and comprising a housing (2) on which the light module (4, 12) is arranged, wherein the light module (4, 12) is rotatably supported on the housing (2) by at least one bearing (6, 8, 14, 16) to be rotatable about at least two bearing axes, wherein a first bearing axis is fixed in position relative to the housing (2) and a second bearing axis is variable in position relative to the housing (2), and wherein at least one eccentric (28, 30, 54, 56) is provided between the light module (4, 12) and the housing (2) and is configured so that when the eccentric (28, 30, 54, 56) is adjusted, the light module (4, 12) is rotatable relative to the bearing (6, 8, 14, 16), characterized in that at least two eccentrics (28, 30, 54, 56) are provided, wherein when a first eccentric is adjusted, the light module (4, 12) is rotatable about a bearing axis, and wherein when a second eccentric (54, 56) is adjusted, the light module (4, 12) is rotatable about a second bearing axis independently of the first bearing axis.

2. The optical device according to claim 1, wherein the eccentric (28, 30, 54, 56) is spaced apart from the axis of rotation of the light module (4, 12), wherein the eccentric (54, 56) acts directly on the light module (4, 12).

3. The optical device according to claim 1, wherein the eccentrics (28, 30, 54, 56) are arranged and designed so that when the first eccentric (28, 30) is adjusted, additionally the second eccentric (54, 56) is displaced along with the light module (4, 12) so that a rotary position of the light module (4, 12) remains constant relative to the second bearing axis and is also changed relative to the first bearing axis.

4. The optical device according to claim 1, wherein the eccentrics (28, 30, 54, 56) are arranged at a parallel distance from each other.

5. The optical device according to claim 1, wherein the light module (4, 12) is rotatably supported between two bearings (6, 8, 14, 16) which span one bearing axis, wherein the light module (4, 12) is rotatable about the bearing axis or with the bearing axis by the eccentric (28, 30, 54, 56) or by the second eccentric (28, 30, 54, 56).

6. The optical device according to claim 5, wherein one bearing is a housing bearing (6, 14) fixed to the housing, and wherein the other bearing is a movable bearing (8, 16)

displaceable relative to the housing (2) at least in one spatial direction so that the one bearing axis is displaceable or rotatable, wherein the movable bearing (8, 16) is moved by the eccentric (28, 30) to adjust the position of the light module (4, 12).

7. The optical device according to claim 6, wherein the movable bearing (8, 16) is provided on a carriage (10, 18) or on the adjustment unit in the form of a carriage (10, 18) which is supported to be displaceable in at least one spatial direction at the housing (2) on a carriage guide (34).

8. A vehicle comprising an optical device according to claim 1.

9. An optical device for a vehicle comprising at least one light module (4, 12) which includes at least one light source, and comprising a housing (2) on which the light module (4, 12) is arranged, wherein the light module (4, 12) is rotatably supported on the housing (2) by at least one bearing (6, 8, 14, 16) to be rotatable about at least two bearing axes, wherein a first bearing axis is fixed in position relative to the housing (2) and a second bearing axis is variable in position relative to the housing (2), and wherein at least one eccentric (28, 30, 54, 56) is provided between the light module (4, 12) and the housing (2) and is configured so that when the eccentric (28, 30, 54, 56) is adjusted, the light module (4, 12) is rotatable relative to the bearing (6, 8, 14, 16), characterized in that at least two eccentrics (28, 30, 54, 56) are provided, wherein when a first eccentric is adjusted, the light module (4, 12) is rotatable about the first bearing axis, and wherein when a second eccentric (54, 56) is adjusted, the light module (4, 12) is rotatable about the second bearing axis independently of the first bearing axis.

10. The optical device according to claim 1, wherein the eccentric (28, 30, 54, 56) is spaced apart from the axis of rotation of the light module (4, 12), wherein the eccentric (28, 30) acts on the light module (4, 12) through an adjustment unit (10, 18), wherein the eccentric (28, 30), the adjustment unit (10, 18) and the light module (4, 12) are configured so that rotation of the eccentric (28, 30) about its axis of rotation translationally displaces the adjustment unit (10, 18) and the adjustment unit (10,18) in turn rotates the light module (4, 12) about the bearing.

11. The optical device according to claim 1, wherein the eccentric (28, 30, 54, 56) is spaced apart from the axis of rotation of the light module (4, 12), wherein the eccentric (28, 30) and a further eccentric (28, 30) act on the light module (4, 12) through an adjustment unit (10, 18), wherein the eccentric (28, 30), the adjustment unit (10, 18) and the light module (4, 12) are configured so that rotation of the eccentric (28, 30) about its axis of rotation translationally displaces the adjustment unit (10, 18) and the adjustment unit (10, 18) in turn rotates the light module (4, 12) about the bearing.

12. The optical device according to claim 1, wherein the eccentric (28, 30, 54, 56) is spaced apart from the axis of rotation of the light module (4, 12), wherein a further eccentric (28, 30) acts on the light module (4, 12) through an adjustment unit (10, 18), wherein the eccentric (28, 30), the adjustment unit (10, 18) and the light module (4, 12) are configured so that rotation of the eccentric (28, 30) about its axis of rotation translationally displaces the adjustment unit (10, 18) and the adjustment unit (10, 18) in turn rotates the light module (4, 12) about the bearing.

13. The optical device according to claim 1, wherein the light module (4, 12) is rotatably supported between two bearings (6, 8, 14, 16) which span the second bearing axis, wherein the light module (4, 12) is rotatable about the second bearing axis or with the second bearing axis by the eccentric (28, 30, 54, 56) or by the second eccentric (28, 30, 54, 56).

14. The optical device according to claim 13, wherein one bearing is a housing bearing (6, 14) fixed to the housing, and wherein the other bearing is a movable bearing (8, 16) displaceable relative to the housing (2) at least in one spatial direction so that the second bearing axis is displaceable or rotatable, wherein the movable bearing (8, 16) is moved by the eccentric (28, 30) to adjust the position of the light module (4, 12).

* * * * *